(12) United States Patent
Morii

(10) Patent No.: US 11,467,985 B2
(45) Date of Patent: Oct. 11, 2022

(54) SYSTEM, TARGET APPARATUS, TERMINAL, PROGRAM, AND METHOD

(71) Applicant: YAMAHA CORPORATION, Hamamatsu (JP)

(72) Inventor: Taro Morii, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 636 days.

(21) Appl. No.: 15/667,983

(22) Filed: Aug. 3, 2017

(65) Prior Publication Data

US 2017/0329725 A1  Nov. 16, 2017

Related U.S. Application Data

(63) Continuation of application No. PCT/JP2016/055063, filed on Feb. 22, 2016.

(30) Foreign Application Priority Data

Feb. 26, 2015 (JP) .............................. JP2015-036668

(51) Int. Cl.
*G06F 13/10* (2006.01)
*G06F 3/06* (2006.01)
(Continued)

(52) U.S. Cl.
CPC .......... *G06F 13/105* (2013.01); *G06F 3/0482* (2013.01); *G06F 3/0488* (2013.01);
(Continued)

(58) Field of Classification Search
CPC .... G06F 13/105; G06F 3/0482; G06F 3/0488; G06F 3/0601; G06F 3/0664; G08C 17/02;
(Continued)

(56) References Cited

U.S. PATENT DOCUMENTS 7,492,877 B2 * 2/2009 Yamagishi .............. H04L 12/12
379/102.01
8,253,857 B2 * 8/2012 Koike ................ H04N 21/4113
348/706
(Continued)

FOREIGN PATENT DOCUMENTS

EP  2613556 A1  7/2013
EP  2744218 A1  6/2014
(Continued)

OTHER PUBLICATIONS

Extended European Search Report issued in European Appln. No. 16755414.6 dated Aug. 29, 2018.
(Continued)

*Primary Examiner* — John E Johansen
(74) *Attorney, Agent, or Firm* — Rossi, Kimms & McDowell LLP

(57) ABSTRACT

A system includes: a terminal that is capable of executing a plurality of programs; and a target apparatus that is capable of communicating with the terminal. The target apparatus includes: an acceptance unit that receives a specific operation; and a transmission unit that transmits trigger information to the terminal upon the acceptance unit receiving the specific operation. The terminal includes: a receiving unit that receives the trigger information from the transmission unit; a selection unit that selects a program corresponding to the target apparatus from the plurality of programs upon the receiving unit receiving the trigger information; and a processing unit that performs processing corresponding to the selected program.

12 Claims, 10 Drawing Sheets

(51) Int. Cl.
*H04M 11/00* (2006.01)
*G06F 3/0482* (2013.01)
*H04Q 9/00* (2006.01)
*G08C 17/02* (2006.01)
*G06F 3/0488* (2022.01)
*H04M 1/72415* (2021.01)

(52) U.S. Cl.
CPC .......... *G06F 3/0601* (2013.01); *G06F 3/0664* (2013.01); *G08C 17/02* (2013.01); *H04M 1/72415* (2021.01); *H04M 11/00* (2013.01); *H04Q 9/00* (2013.01); *G08C 2201/93* (2013.01)

(58) Field of Classification Search
CPC .......... G08C 2201/93; H04M 1/72533; H04M 11/00; H04M 1/72415; H04Q 9/00
USPC .......................................................... 703/24
See application file for complete search history.

(56) References Cited

U.S. PATENT DOCUMENTS

| | | | | |
|---|---|---|---|---|
| 8,942,694 | B2* | 1/2015 | Woo | H04L 12/40013 455/420 |
| 8,953,099 | B2* | 2/2015 | Kwak | H04N 21/42204 345/169 |
| 2006/0041655 | A1* | 2/2006 | Holloway | H04N 21/42208 709/223 |
| 2010/0214479 | A1 | 8/2010 | Koike et al. | |
| 2012/0084662 | A1* | 4/2012 | Navarro | H04N 21/812 715/740 |
| 2012/0173979 | A1* | 7/2012 | Lee | G06F 9/452 715/740 |
| 2012/0317498 | A1* | 12/2012 | Logan | G06F 3/04817 715/752 |
| 2013/0014143 | A1* | 1/2013 | Bhatia | H04N 21/252 725/13 |
| 2013/0176205 | A1* | 7/2013 | Yamashita | G06F 3/0482 345/156 |
| 2014/0253301 | A1* | 9/2014 | Hirayama | G08C 23/04 340/12.54 |
| 2014/0364056 | A1* | 12/2014 | Belk | H04W 4/00 455/41.1 |

FOREIGN PATENT DOCUMENTS

| | | | |
|---|---|---|---|
| JP | 2010226701 A | | 10/2010 |
| JP | 2011103547 A | * | 5/2011 |
| JP | 2011103547 A | | 5/2011 |
| JP | 2013138279 A | | 7/2013 |

OTHER PUBLICATIONS

International Search Report issued in Intl. Appln. No. PCT/JP2016/055063 dated Apr. 19, 2016. English translation provided.
Written Opinion issued in Intl. Appln. No. PCT/JP2016/055063 dated Apr. 19, 2016.
Summons to attend oral proceedings issued in European Appln. No. 16755414.6 dated Aug. 27, 2021.
Office Action issued in European Appln. No. 16755414.6 dated Apr. 19, 2022.

* cited by examiner

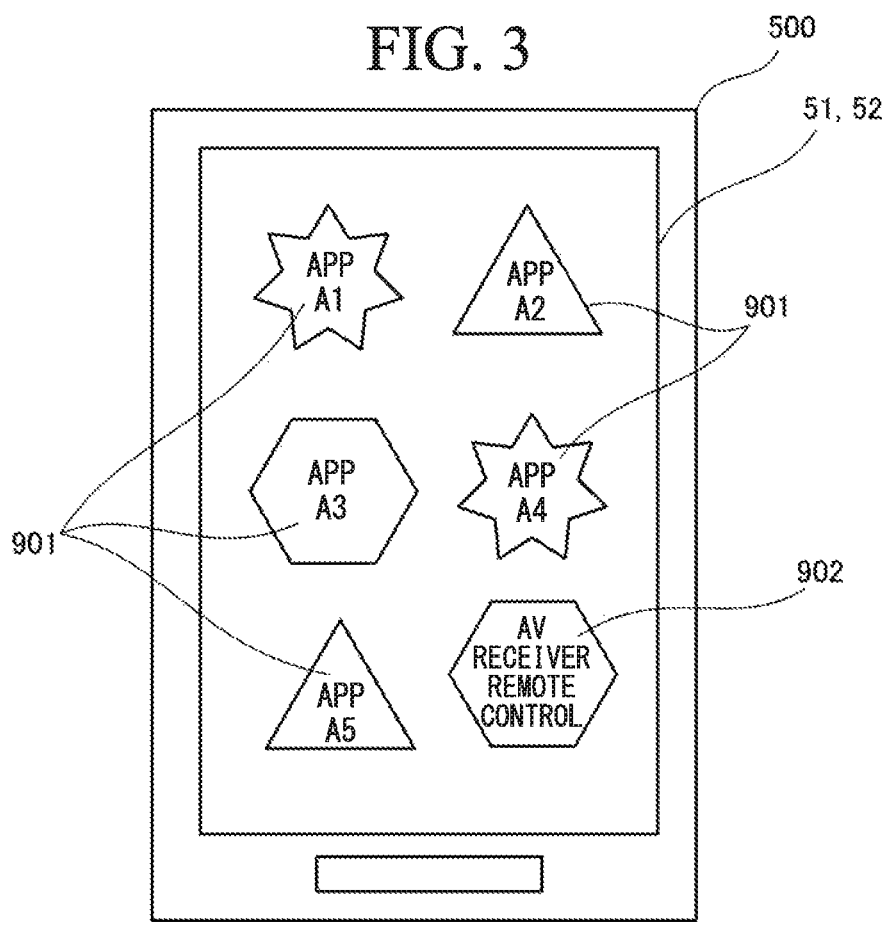

SYSTEM, TARGET APPARATUS, TERMINAL, PROGRAM, AND METHOD

CROSS-REFERENCE TO RELATED APPLICATIONS

The present application is a continuation application of International Application No. PCT/JP2016/055063, filed Feb. 22, 2016, which claims priority to Japanese Patent Application No. 2015-036668, filed Feb. 26, 2015. The contents of these applications are incorporated herein by reference.

BACKGROUND OF THE INVENTION

Field of the Invention

The present invention relates to a system including a terminal that can execute a plurality of programs, and a target apparatus that can communicate with the terminal.

Description of Related Art

Conventionally, a mobile phone terminal is known as an example of a terminal that can execute a plurality of programs. For example, a mobile phone terminal disclosed in Japanese Unexamined Patent Application, First Publication No. 2013-138279 (hereinafter referred to as Patent Document 1) stores, as a program, a control program that controls a recording and playback apparatus (target apparatus). Specifically, the control program disclosed in Patent Document 1 realizes display of a plurality of control contents, and transmission of a remote control signal which corresponds to a control content selected by a user, to a target apparatus. The control program is activated when a user selects an icon that is displayed on the mobile phone terminal for example. The icon is displayed by a display program of the mobile phone terminal.

The mobile phone terminal disclosed in Patent Document 1 may store a plurality of control programs because the control program differs depending on the manufacturer or the like of the target apparatus. Furthermore, such a mobile phone terminal is in no way limited to a plurality of control programs, and may also store other programs. The other programs, like the control programs, are activated when a user selects a corresponding icon.

SUMMARY OF THE INVENTION

However, as the number of programs stored by the mobile phone terminal disclosed in Patent Document 1 increases, the number of icons displayed by the display program increases. When the number of displayed icons increases, the number of selectable icons increases. Therefore, the time it takes for a user to select an icon of a program corresponding to a target apparatus becomes longer. Consequently, the time it takes for the mobile phone terminal to start performing display corresponding to a program corresponding to a target apparatus (for example, display of control contents of a target apparatus) becomes longer.

An example of an object of the present invention is to provide a system, a target apparatus, a terminal, a program, and a method that, with respect to a terminal capable of executing a plurality of programs, can shorten the time it takes to start processing corresponding to a program corresponding to a target apparatus.

A system according to an aspect of the present invention includes: a terminal that is capable of executing a plurality of programs; and a target apparatus that is capable of communicating with the terminal. The target apparatus includes: an acceptance unit that receives a specific operation; and a transmission unit that transmits trigger information to the terminal upon the acceptance unit receiving the specific operation. The terminal includes: a receiving unit that receives the trigger information from the transmission unit; a selection unit that selects a program corresponding to the target apparatus from the plurality of programs upon the receiving unit receiving the trigger information; and a processing unit that performs processing corresponding to the selected program.

A target apparatus according to an aspect of the present invention is a target apparatus capable of communicating with a terminal capable of executing a plurality of programs, and includes: an acceptance unit that receives a specific operation; and a transmission unit that transmits trigger information to the terminal upon the acceptance unit receiving the specific operation. The trigger information is information for causing the terminal to select a program corresponding to the target apparatus from the plurality of programs, and to perform processing corresponding to the selected program.

A terminal according to an aspect of the present invention is a terminal that is capable of communicating with a target apparatus and is capable of executing a plurality of programs, and includes: a receiving unit that receives trigger information from the target apparatus upon the target apparatus receiving a specific operation; a selection unit that selects a program corresponding to the target apparatus from the plurality of programs upon the receiving unit receiving the trigger information; and a processing unit that performs processing corresponding to the selected program.

A program according to an aspect of the present invention causes a terminal that is capable of communicating with a target apparatus and is capable of executing a plurality of programs to execute: receiving trigger information from the target apparatus; selecting a program corresponding to the target apparatus from the plurality of programs upon receiving the trigger information; and performing processing corresponding to the selected program. The trigger information is transmitted in a case where the target apparatus receives a specific operation.

A method according to an aspect of the present invention is for a target apparatus capable of communicating with a terminal device capable of executing a plurality of programs, and includes: receiving a specific operation; and transmitting trigger information to the terminal upon receiving the specific operation. The trigger information is information for causing the terminal to select a program corresponding to the target apparatus from the plurality of programs, and to perform processing corresponding to the selected program.

A method according to an aspect of the present invention is a method for a terminal capable of communicating with a target apparatus and capable of executing a plurality of programs, and includes: receiving trigger information from the target apparatus upon the target apparatus receiving a specific operation; selecting a program corresponding to the target apparatus from the plurality of programs upon receiving the trigger information; and performing processing corresponding to the selected program.

According to the system, the target apparatus, the terminal, and the program of the present invention, the terminal can shorten the time it takes to start processing corresponding to the program corresponding to the target apparatus.

BRIEF DESCRIPTION OF THE DRAWINGS

FIG. 3 is a diagram for describing an operation of a display program of the smartphone shown in FIG. 2A, showing an example of an initial screen on the smartphone.

EMBODIMENTS FOR CARRYING OUT THE INVENTION

Figure 1:
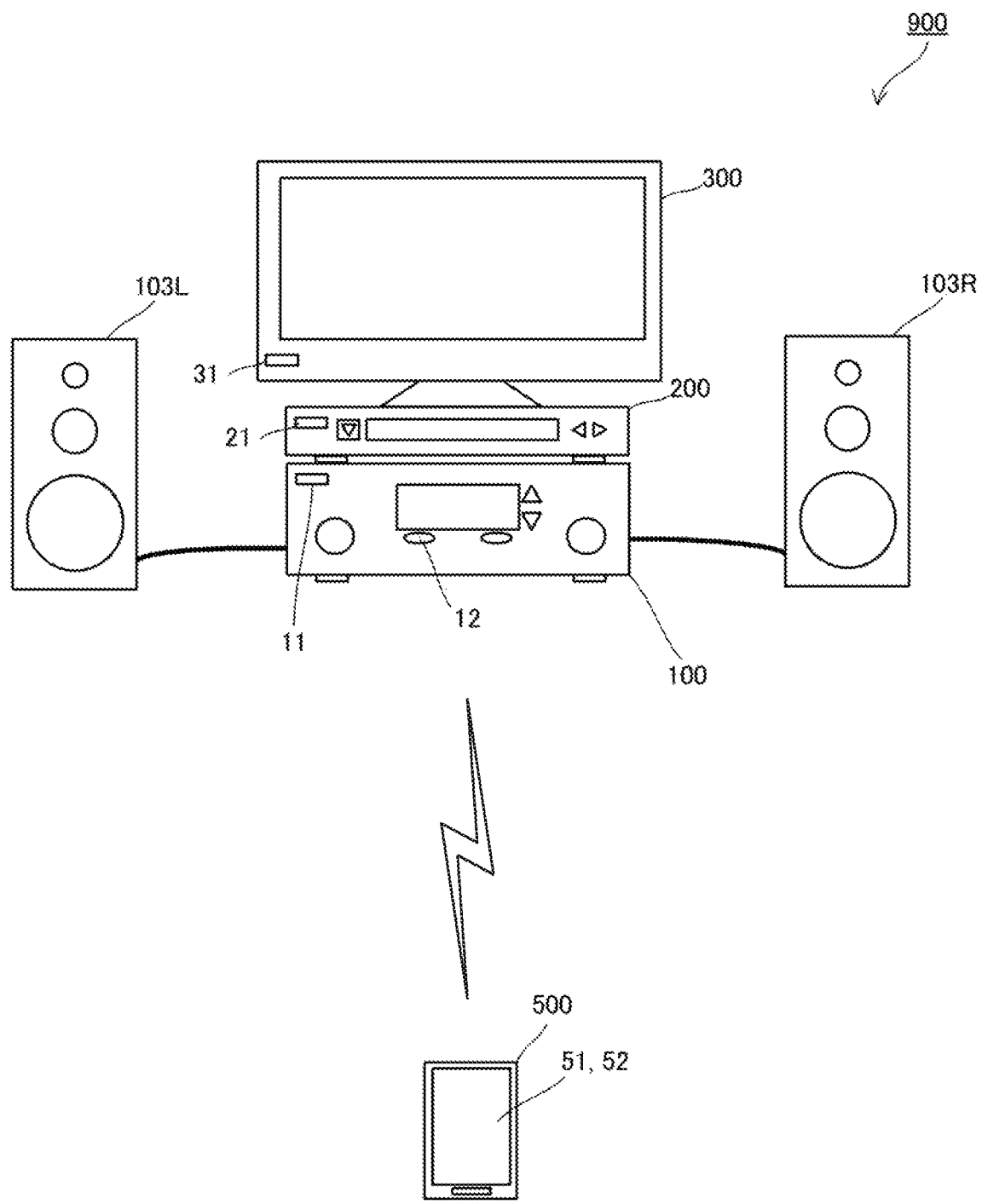
FIG. 1 is a diagram for describing an overview of a target apparatus control system according to an embodiment of the present invention.
Figure 2A:
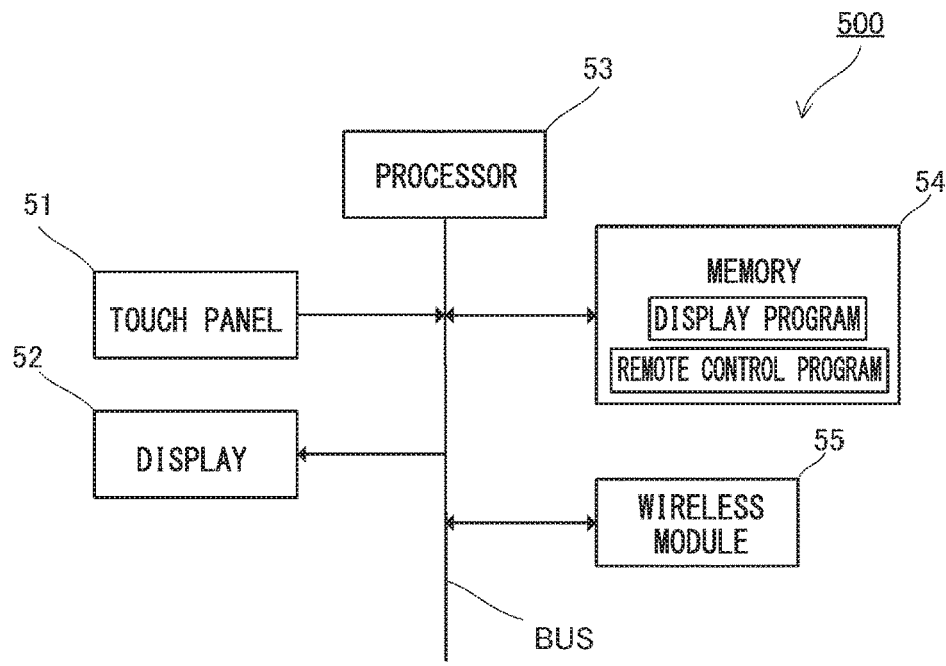
FIG. 2A is a hardware block diagram showing a portion of a configuration of a smartphone according to the embodiment of the present invention.
Figure 2B:
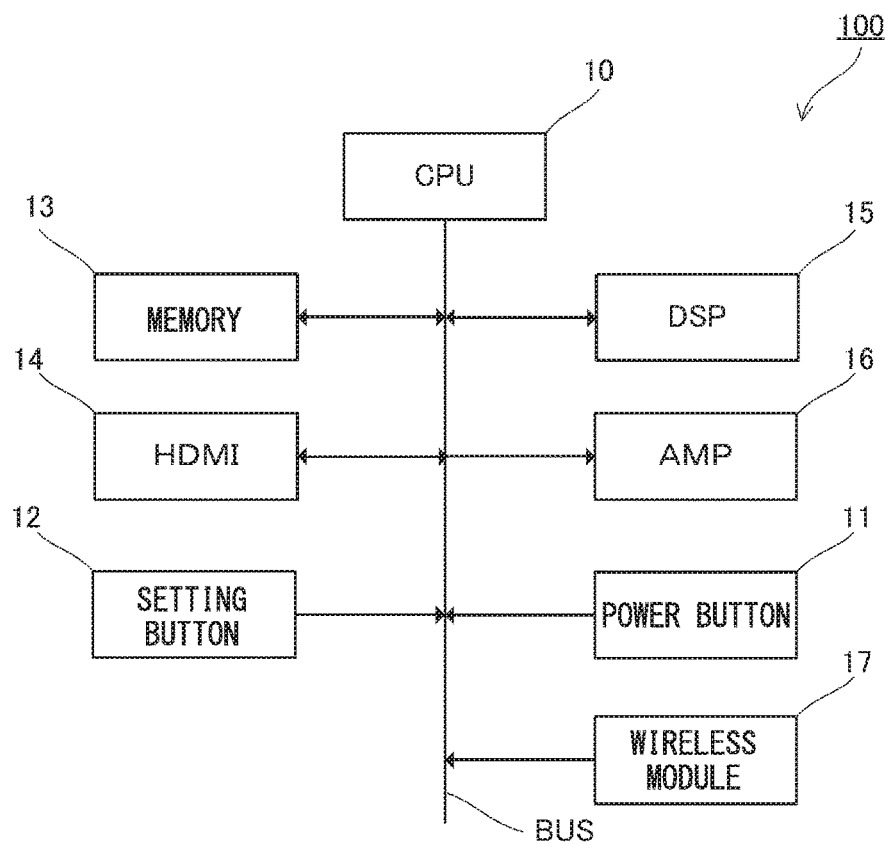
FIG. 2B is a hardware block diagram showing a portion of a configuration of an AV receiver according to the embodiment of the present invention.

A target apparatus control system 900 according to an embodiment of the present invention is described with reference to FIG. 1, FIG. 2A, and FIG. 2B. FIG. 1 is a diagram for describing an overview of the target apparatus control system 900. FIG. 2A is a hardware block diagram showing a portion of a configuration of a smartphone 500. FIG. 2B is a hardware block diagram showing a portion of a configuration of an AV receiver 100.

As shown in FIG. 1, the target apparatus control system 900 includes an AV receiver 100, a content playing device 200, a television (hereunder referred to as a TV) 300, and a smartphone 500. The AV receiver 100 is connected to a loudspeaker 103L and a loudspeaker 103R. The smartphone 500 corresponds to a terminal. The AV receiver 100, the content playing device 200, and the TV 300 each correspond to a target apparatus.

In the target apparatus control system 900, the smartphone 500 stores a remote control program (a program for controlling functions of the AV receiver 100) corresponding to the AV receiver 100. In the target apparatus control system 900, when the AV receiver 100 receives an operation (for example, a power ON operation of the AV receiver 100), the smartphone 500 activates a remote control program.

As shown in FIG. 1 and FIG. 2A, the smartphone 500 includes a touch panel 51, a display 52, a processor 53, a memory 54, and a wireless module 55. The components of the smartphone 500 are connected to a common BUS.

A receiving unit, a selection unit, a processing unit, and a display unit of the terminal may each correspond to at least one of the components of the smartphone 500. For example, the receiving unit may correspond to the wireless module 55 and the processor 53. The selection unit and the processing unit may each correspond to the processor 53. The display unit may correspond to the display 52.

The processor 53 of the smartphone 500 collectively controls each of the other components of the smartphone 500. The wireless module 55, for example, realizes transmission and reception of information by a wireless standard such as the Wi-Fi (registered trademark) standard. The touch panel 51 realizes reception of an operation input from a user. The smartphone 500 realizes a GUI (Graphical User Interface) by means of the touch panel 51 and the display 52.

As shown in FIG. 2A, the memory 54 stores a remote control program corresponding to the AV receiver 100. As shown in FIG. 2A, the memory 54 also stores a display program. Details of the display program are mentioned below. The programs are read out and executed by the processor 53. The various functions are realized by executing the programs. For example, when the remote control program corresponding to the AV receiver 100 is executed, a remote control signal that can be received by the AV receiver 100 is transmitted by the Bluetooth (registered trademark) standard or the Wi-Fi (registered trademark) standard by controlling the wireless module 55.

As shown in FIG. 1 and FIG. 2B, the AV receiver 100 includes a power button 11, a setting button 12, a CPU (Central Processing Unit) 10, a memory 13, a HDMI (High Definition Multimedia Interface (HDMI is a registered trademark)) 14, a DSP (Digital Signal Processor) 15, an AMP (Amplifier) 16. and a wireless module 17. The components of the AV receiver 100 are connected to a common BUS.

An acceptance unit and a transmission unit of the target apparatus may each correspond to at least one of the components of the AV receiver 100. For example, the acceptance unit may correspond to the power button 11, the setting button 12, and the CPU 10. The transmission unit may correspond to the wireless module 17 and the CPU 10.

The power button 11 receives an operation from a user to power ON or OFF the AV receiver 100. The setting button 12 receives an operation from a user that changes the setting contents of the AV receiver 100. The CPU 10 collectively controls the other components of the AV receiver 100. The HDMI 14 is an interface for inputting content data from the content playing device 200 and outputting content data to the TV 300. The DSP 15 is a processor that performs various audio processing with respect to audio data included in the content data. The AMP 16 amplifies an audio signal of audio data following audio processing. The audio signal following amplification is output to the loudspeaker 103L and the loudspeaker 103R. The wireless module 17 realizes transmission and reception of information by a wireless standard such as the Wi-Fi (registered trademark) standard.

The wireless module 17 receives a remote control signal transmitted by the smartphone 500 by a wireless standard such as the Bluetooth (registered trademark) standard or the Wi-Fi standard. The remote control signal may be a signal representing an instruction for controlling the function of the AV receiver 100. The remote control signal may be, for example, a signal representing an instruction for controlling a music playing function of the AV receiver 100. The instruction for controlling the music playing function may be an instruction requesting switching of the music content that is played, an instruction requesting an increase or decrease in volume, and the like. The CPU 10 controls the components according to the remote control signal received by the wireless module 17. Consequently, the AV receiver 100 operates according to the remote control signal from the smartphone 500.

As shown in FIG. 1, the content playing device 200 includes a power button 21. Although omitted from the figure, the content playing device 200, similarly to the AV receiver 100, includes a CPU that controls the components of the content playing device 200, a wireless module, and the like. When the content playing device 200 receives a remote control signal from the smartphone 500 by means of the wireless module, it operates according to the remote control signal. In the same manner, the TV 300 includes a power button 31. Although omitted from the figure, the TV 300 includes a CPU that controls the components of the TV 300, a wireless module, and the like. When the TV 300 receives a remote control signal from the smartphone 500 by means of the wireless module, it operates according to the remote control signal.

The transmission and reception of the remote control signal may be performed by a standard other than the Bluetooth (registered trademark) standard or the Wi-Fi (registered trademark) standard. For example, the smartphone 500 may include a LED that outputs infrared light, and an infrared light receiving unit. In this case, the smartphone 500 makes the LED flash in a pattern corresponding to the remote control signal. Furthermore, the AV receiver 100 receives the infrared light output by the smartphone 500 by means of an infrared light receiving unit, and converts it to an electrical signal by means of a photoelectric element. The electric signal corresponds to the remote control signal.

Next, FIG. 3 is a diagram for describing an operation of a display program of the smartphone 500, showing an example of an initial screen on the smartphone 500.

The display program of the smartphone 500 is activated when the power of the smartphone 500 is turned ON, and it makes the display 52 display the initial screen shown in FIG. 3. The initial screen shown in FIG. 3 displays a plurality of icons 901 and an icon 902. The respective icons display information for identifying the program associated with the icon. In the example shown in FIG. 3, the name of the program is used as information for identifying the program associated with the icon. For example, the icon 902 is displayed together with the name of the remote control program (AV receiver remote control) associated with the icon 902.

When the touch panel 51 receives a touch operation from a user, the display program of the smartphone 500 specifies the icon displayed at the location of the touch operation. When the display program specifies the icon displayed at the location of the touch operation, it controls the display content of the display 52 according to the program associated with the icon. For example, by activating the program associated with the icon, the display program realizes display corresponding to the program.

The greater the number of programs that are stored in the memory 54 of the smartphone 500, the greater the number of icons that are displayed on the initial screen of the display 52. As a result, the time it takes for a user to select the icon 902 corresponding to the remote control program for the AV receiver 100 becomes longer. That is to say, the greater the number of programs that are stored in the memory 54, the longer the time it takes for the remote control program to be activated. In other words, the greater the number of programs that are stored in the memory 54, the longer the time it takes for display resulting from activation of the remote control program to be started. Therefore, in the target apparatus control system 900 according to the present embodiment, when a user utilizes the AV receiver 100, the time it takes for activation of the remote control program becomes shorter as a result of performing automatic activation processing.

Figure 4A:
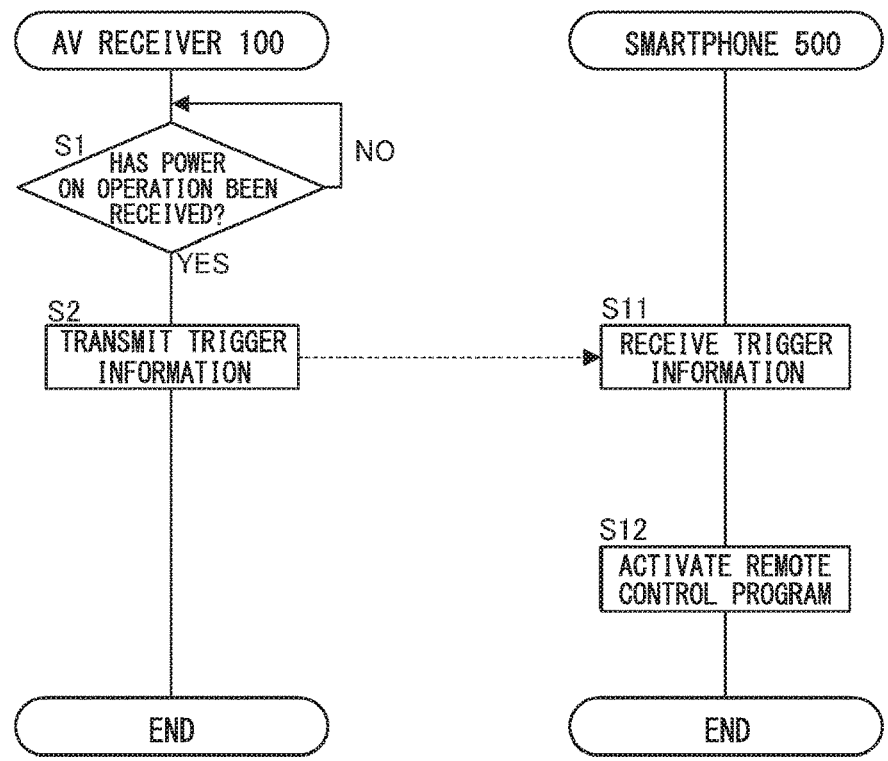
FIG. 4A is a flow chart for describing an example of automatic activation processing in the embodiment of the present invention, showing the operations of the AV receiver and the smartphone.
Figure 4B:
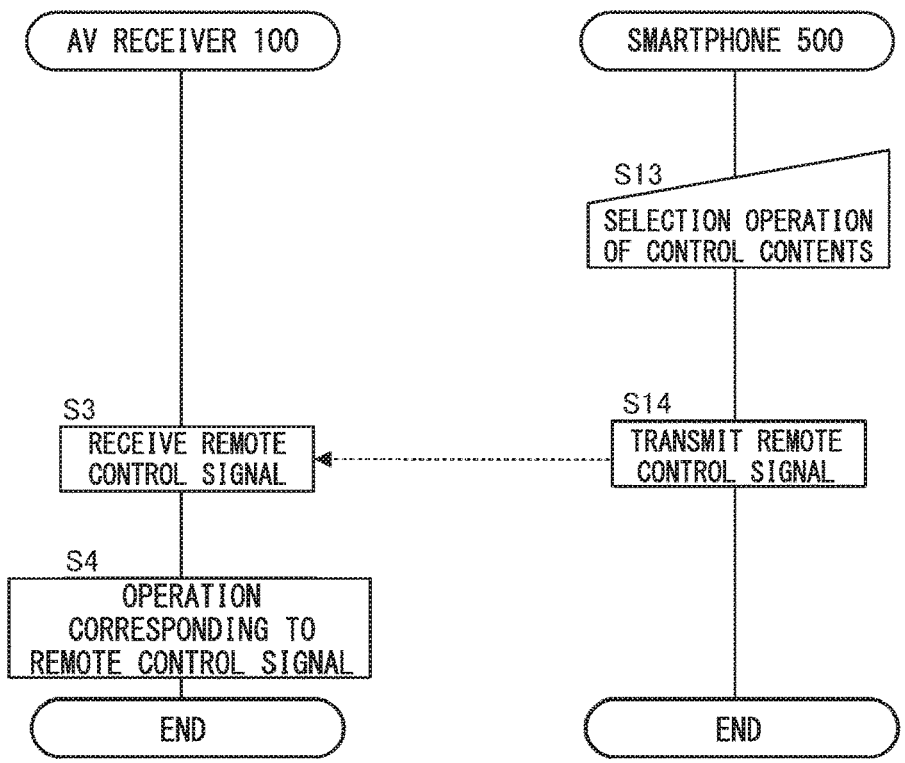
FIG. 4B is a flow chart for describing an operation of a remote control program in the embodiment of the present invention, showing the operations of the AV receiver and the smartphone.
Figure 5:
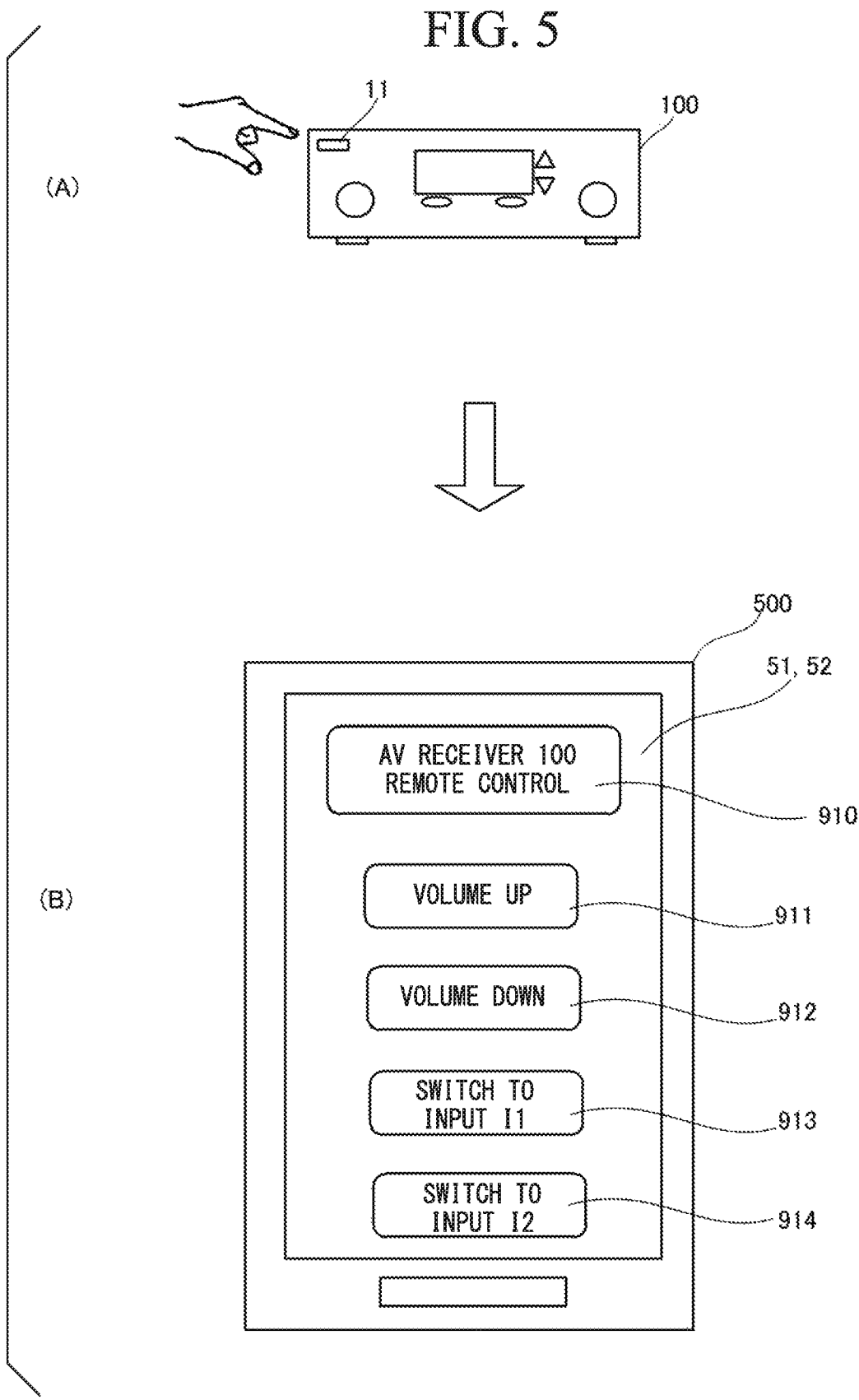
FIG. 5 is a diagram showing an example of an operation received by the AV receiver, and a display example on the smartphone after the operation is received by the AV receiver in the embodiment of the present invention.

FIG. 4A is a flow chart for describing an example of automatic activation processing, showing the operations of the AV receiver 100 and the smartphone 500. FIG. 4B is a flow chart for describing an operation of the remote control program, showing the operations of the AV receiver 100 and the smartphone 500. Part (A) of FIG. 5 is a diagram for describing an example of automatic activation processing, showing an example of an operation (power ON operation) received by the AV receiver 100. Part (B) of FIG. 5 is a diagram for describing an example of automatic activation processing, showing a display example of the smartphone 500 after the operation is received by the AV receiver 100.

Firstly, the AV receiver 100 determines whether or not a power ON operation of the AV receiver 100 has been received (step S1). If the power button 11 has not been depressed, the AV receiver 100 determines a power ON operation has not been received from a user (step S1: NO), and waits until a power ON operation is received.

As shown in part (A) of FIG. 5, when the power button 11 is depressed, the AV receiver 100 determines that it has received a power ON operation (step S1: YES), and transmits trigger information to the smartphone 500 (step S2). The trigger information represents information that serves as a trigger to activate a remote control program (information instructing activation of a program relating to the AV receiver 100). The transmission and reception of the trigger information is performed by the Wi-Fi (registered trademark) standard. In the example shown in FIG. 5, a network address of the smartphone 500 is stored beforehand in the memory 13 of the AV receiver 100. Furthermore, the CPU 10 transmits the trigger information that is read out from the memory 13, to the network address of the smartphone 500. The present embodiment is in no way limited to such an example. The trigger information may be transmitted and received via the Internet, which is not shown in the figure. In a case where the trigger information is transmitted and received via the Internet, the memory 13 of the AV receiver 100 stores information (a global IP address for example) beforehand that specifies the smartphone 500 on the Internet. As an alternative method, the AV receiver 100 may transmit the trigger information by a broadcast without specifying a network address.

When the wireless module 55 receives the trigger information from the AV receiver 100 (step S11), the display program of the smartphone 500 activates the remote control program corresponding to the AV receiver 100 from the plurality of programs (step S12). When the remote control program is activated, the display of the smartphone 500 is changed for example from the initial screen display shown in FIG. 3 to a display corresponding to the remote control program as shown in part (B) of FIG. 5.

Specifically, as shown in part (B) of FIG. 5, a program title 910, a software button 911, a software button 912, a software button 913, and a software button 914 are displayed on the smartphone 500 following the change in display. The software buttons 911 to 914 are displayed together with text information representing the control contents with respect to the AV receiver 100. For example, the software button 911 is displayed together with information indicating that the control content is an increase in volume.

Following automatic activation processing, the AV receiver 100 and the smartphone 500 perform the operations shown in the flow chart of FIG. 4B. Firstly, a user performs an operation to select the control content (step S13). That is to say, the remote control program specifies the control content selected by a user. Specifically, the remote control program specifies the software button among the plurality of software buttons 911 to 914 that was touched by a user, and specifies the control content corresponding to the specified software button.

When the remote control program specifies the control content (step S13), it controls the wireless module 55 of the smartphone 500 and transmits a remote control signal corresponding to the control content, to the AV receiver 100.

When the AV receiver 100 receives the remote control signal from the smartphone 500 by means of the wireless module 17 (step S3), it performs the operation (for example, an increase in volume) corresponding to the remote control signal.

In the target apparatus control system 900 according to the present embodiment, the display program of the smartphone 500 activates the remote control program corresponding to the AV receiver 100 simply by a user operating the AV receiver 100. Therefore, in the smartphone 500, an operation of selecting the icon 902 corresponding to the remote control program from the initial screen of the smartphone 500 becomes unnecessary. That is to say, an operation of selecting an icon on the smartphone 500 becomes unnecessary. Consequently, the time it takes to start performing display according to the remote control program can be shortened.

Furthermore, the smartphone 500 is able to perform display according to the remote control program corresponding to the AV receiver 100 in response to an intentional power ON operation of the AV receiver 100 by a user.

The operation that serves as a trigger to transmit the trigger information is in no way limited to depressing the power button 11. For example, the AV receiver 100 may, in a case where the power button 11 is continuously pressed for a long period (for example, three or more seconds), transmit the trigger information and also make the components of its own device an operable state. On the other hand, the AV receiver 100 may, in a case where the power button 11 is continuously pressed for a short period (for example, less than three seconds), simply make the components of its own device an operable state without transmitting the trigger information. The operation that serves as a trigger may also be an operation with respect to an operation element other than the power button 11 (for example, depressing an application activation button).

Figure 6:
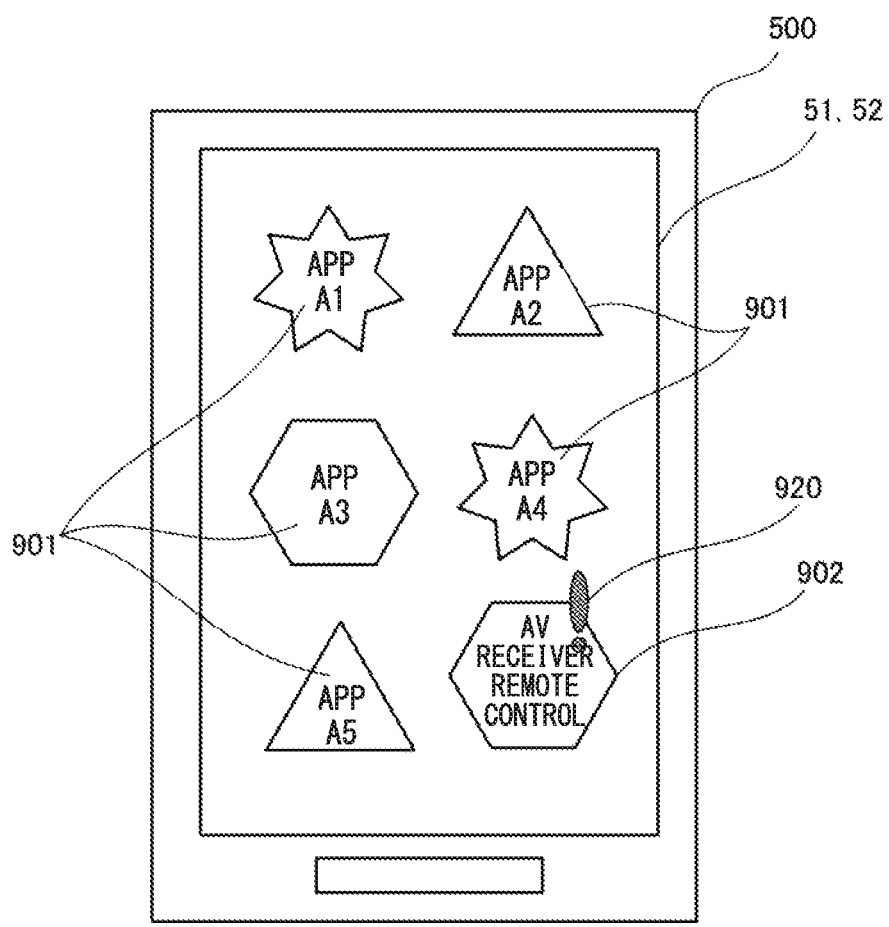
FIG. 6 is a diagram showing a display example according to a modification of the display on the smartphone after the operation is received by the AV receiver in the embodiment of the present invention.

The display corresponding to the remote control program is in no way limited to the example shown in part (B) of FIG. 5. FIG. 6 is a diagram showing a modification of the display on the smartphone 500 after the operation is received by the AV receiver 100.

In the example shown in FIG. 6, when the display program of the smartphone 500 receives the trigger information, it performs notification (a notification of the icon 902) that prompts activation of the icon 902 without immediately activating the remote control program associated with the icon 902. Specifically, the display program displays the icon 902 on the initial screen of the smartphone 500 such that it is easily discriminated from the plurality of other icons 901 by adding an identifying display 920 to the icon 902. Therefore, the time it takes for a user to select the icon 902 is shortened. Consequently, in the display example shown in FIG. 6, the smartphone 500 is such that, as a result of the AV receiver 100 simply receiving an operation, the time it takes to start performing display corresponding to the remote control program can be shortened.

The notification of the icon 902 is in no way limited to addition of an identifying display. For example, the smartphone 500 may change the shape and size of the icon 902 as the notification of the icon 902. The smartphone 500 may also perform a notification that prompts activation of the remote control program by a display other than the icon 920 as the notification of the icon 902. The notification of the icon 902 is in no way limited to performing a display that prompts activation of the icon 902. For example, the smartphone 500 may perform a notification that prompts activation of the remote control program by audio and the like as the notification of the icon 902.

Figure 7:
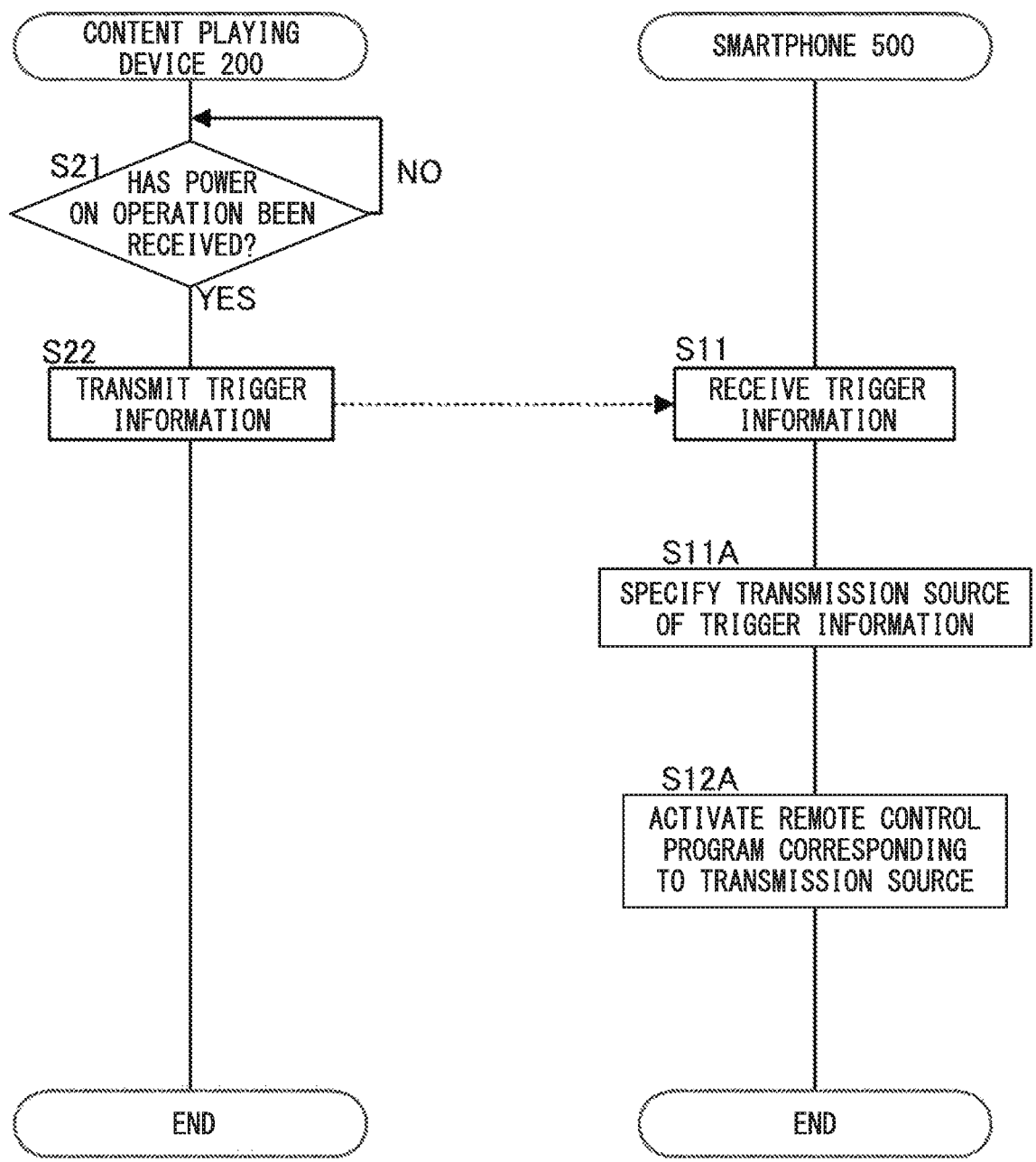
FIG. 7 is a flow chart for describing a modified example 1 of automatic activation processing in the embodiment of the present invention, showing the operations of a content playing device and the smartphone.

Next, FIG. 7 is a flow chart for describing a modified example 1 representing a modified example of the automatic activation processing shown in FIG. 4A, showing the operations of the content playing device 200 and the smartphone 500.

The modified example 1 of automatic activation processing differs from the example of the automatic activation processing shown in FIG. 4A in the aspect that the display program of the smartphone 500 specifies a transmission source of the trigger information, and activates a target program corresponding to the specified transmission source. Specifically, the flow chart shown in FIG. 7 differs from the flow chart shown in FIG. 4A in the aspect that step S11A and step S12A are executed. Description of duplicated operations is omitted.

In the example shown in FIG. 7, the smartphone 500 stores beforehand a target program P1 corresponding to the AV receiver 100, a target program P2 corresponding to the content playing device 200, and a target program P3 corresponding to the TV 300.

As shown in FIG. 7, when the content playing device 200 receives a power ON operation (step S21), it transmits trigger information to the smartphone 500 (step S22). The transmission and reception of trigger information between the content playing device 200 and the smartphone 500 is performed by the Wi-Fi standard for example. When the display program of the smartphone 500 receives the trigger information from the content playing device 200 (step S11), it identifies the transmission source of the trigger information (step S11A).

In a case where the content playing device 200 and the smartphone 500 are connected to the same network, the transmission source of the trigger information is specified by referring to the transmission source IP (Internet Protocol) address of the data packet containing the trigger information. In this case, the smartphone 500 stores beforehand the IP address of the content playing device 200 in the memory 54.

A case where the content playing device 200 and the smartphone 500 are not connected to the same network, and the content playing device 200 and the smartphone 500 are connected via separate networks, such as the Internet, is described. In this case, the content playing device 200 adds identifying information about its own device in the trigger information, and transmits the trigger information to the smartphone 500 via the Internet for example. A device ID (Identifier), a MAC (Media Access Control) address, and the like, can be used as the identifying information. The smartphone 500 specifies the transmission source of the trigger information by extracting the identifying information from the trigger information. In this case, the identifying information associated with the transmission source is stored beforehand in the memory 54 of the smartphone 500.

When the display program of the smartphone 500 specifies the transmission source of the trigger information (step S11A), it activates the target program corresponding to the transmission source (step S12A). In this case, the smartphone 500 stores beforehand information about the transmission source, and the target program to be activated, in the memory 54 such that they are associated. In the example shown in FIG. 7, the display program of the smartphone 500 selects the target program P2 corresponding to the content playing device 200 by utilizing the information about the transmission source and referring to the memory 54. Then, the display program of the smartphone 500 activates the selected target program P2. Consequently, the display of the smartphone 500 becomes a display corresponding to the target program P2.

According to the configuration described above, even if a plurality of target apparatus exist, such as the AV receiver 100, the content playing device 200, and the TV 300, the smartphone 500 is able to automatically activate the program corresponding to the target apparatus in which a user performed an operation.

In the example mentioned above, the connection between the AV receiver 100 and the smartphone 500 is realized by the Wi-Fi standard. However, it may be realized by another wireless standard. Bluetooth (registered trademark) can be utilized as a connection by another wireless standard. In addition to Bluetooth (registered trademark), the wireless connection may be a NFC (Near Field Communication). Specifically, the AV receiver 100 includes a NFC tag reader, and the smartphone 500 includes a NFC tag. Then, when the smartphone 500 approaches the AV receiver 100, the NFC tag reader detects the NFC tag of the smartphone 500, and the AV receiver 100 determines that it has received an operation, and transmits trigger information to the smartphone 500. Consequently, the smartphone 500 is able to perform display corresponding to the target program simply by being held over the AV receiver 100 by a user.

The connection between the AV receiver 100 and the smartphone 500 may be realized by wire. In a case where the AV receiver 100 and the smartphone 500 are connected by wire, the target apparatus control system 900 can realize a modified example 2 of automatic activation processing as follows.

Figure 8:
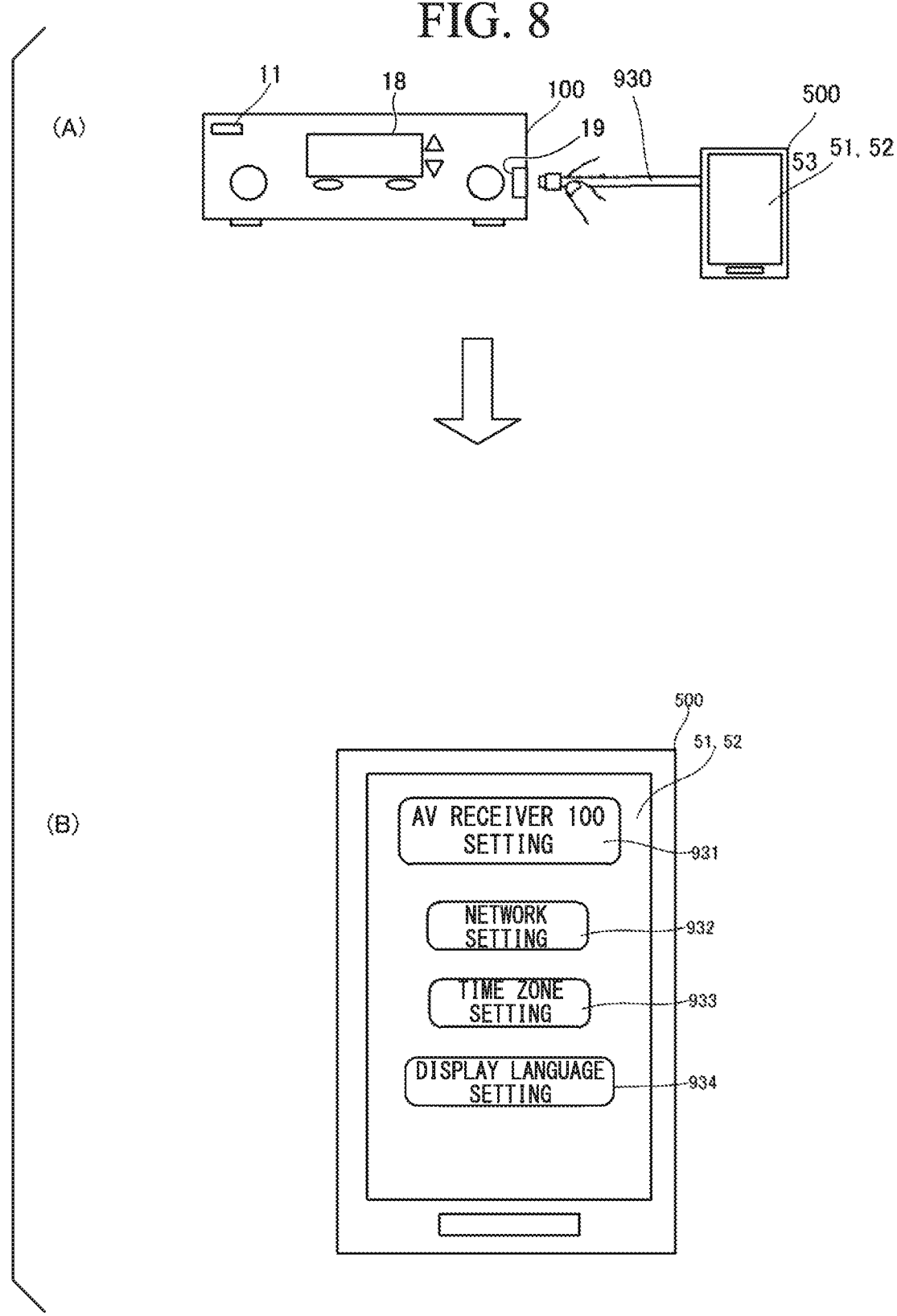
FIG. 8 is a diagram for describing a modified example 2 of automatic activation processing in the embodiment of the present invention, showing an operation example with respect to the AV receiver, and a display example of the smartphone in the modified example 2 after the operation has been received by the AV receiver.

Part (A) of FIG. 8 is a diagram for describing the modified example 2 of automatic activation processing, showing an operation (cable connection operation) with respect to the AV receiver 100. Part (B) of FIG. 8 is a diagram showing a display example of the smartphone 500 in the modified example 2 after the operation has been received by the AV receiver 100.

Specifically, as shown in part (A) of FIG. 8, the AV receiver 100 and the smartphone 500 includes an interface (for example a USB I/F) corresponding to a cable 930. In the example shown in FIG. 8, the interface of the AV receiver 100 corresponding to the cable 930 is a connection terminal (acceptance unit) 19. When the AV receiver 100 recognizes that the smartphone 500 is connected to the connection terminal 19 via the cable 930, it transmits trigger information to the smartphone 500. When the smartphone 500 receives the trigger information via the cable 930, then as shown in part (B) of FIG. 8, it activates a setting program corresponding to the AV receiver 100, and performs display corresponding to the setting program. The setting program may be a program that changes a setting of the AV receiver 100. In the display example shown in part (B) of FIG. 8, a setting program title 931, a software button 932 indicating a network setting, a software button 933 indicating a time zone setting, and a software button 934 indicating a display language setting are displayed. More specifically, the software button 932 is a button that is depressed when a setting for connecting the AV receiver 100 to a network such as the Internet is started. The software button 933 is a button that is depressed when a setting of a time zone that is set with respect to the AV receiver 100 is started. The software button 934 is a button that is depressed when a setting of the language displayed on the display unit 18 or the like (refer to FIG. 8) of the AV receiver 100 is started. When a user touches one of the software buttons and inputs setting content, the input setting content is stored in the memory 13 of the AV receiver 100 via the cable 930.

Figure 9:
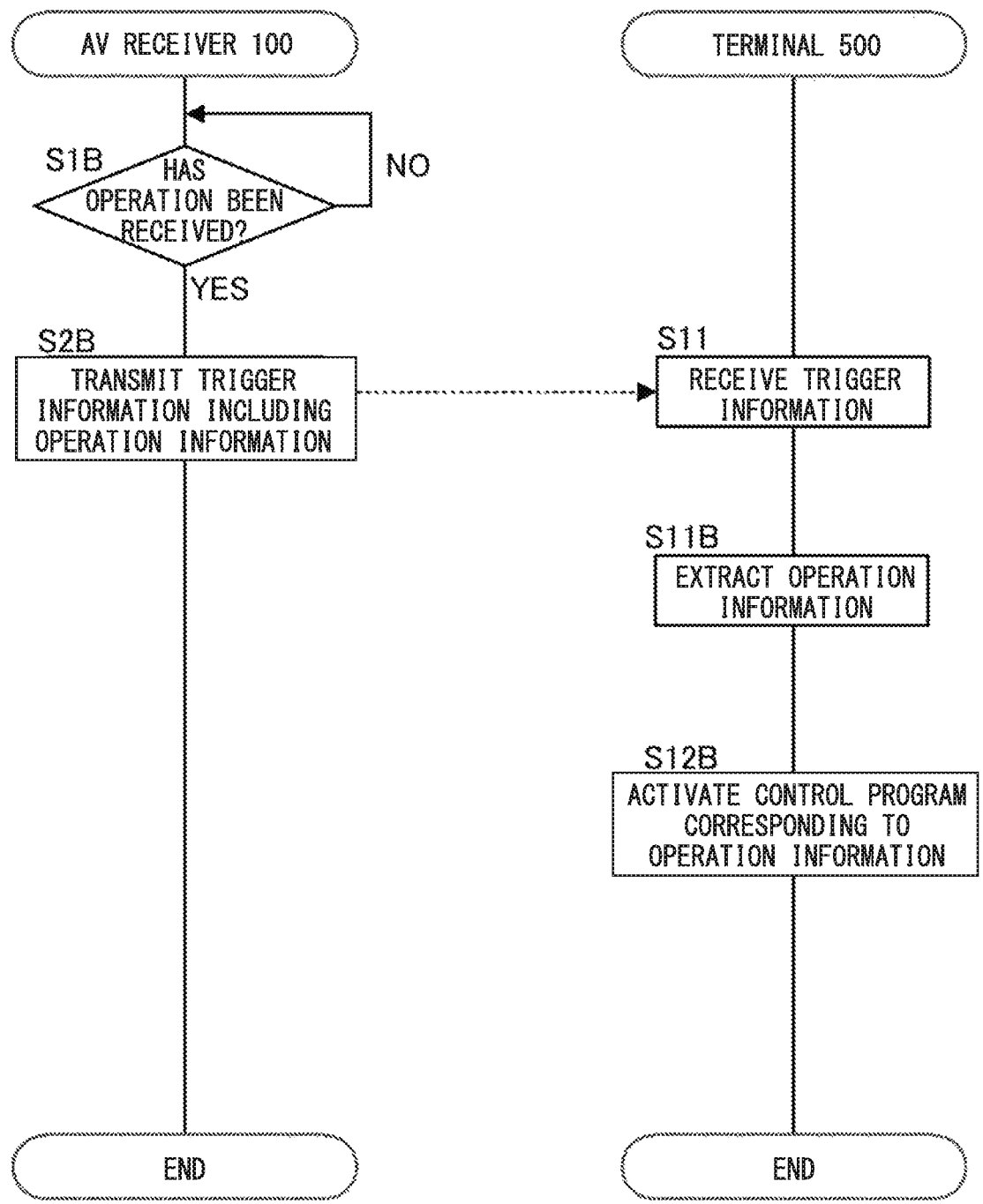
FIG. 9 is a flow chart for describing a modified example 3 of automatic activation processing in an embodiment of the present invention, showing the operations of the AV receiver and the smartphone.

Next, a modified example 3 of automatic activation processing is described with reference to FIG. 9. FIG. 9 is a flow chart for describing the modified example 3 of automatic activation processing, showing the operations of the AV receiver 100 and the smartphone 500.

The modified example 3 of automatic activation processing differs from the automatic activation processing example shown in FIG. 4A in the aspect that the target program activated by the display program of the smartphone 500 is selected according to the content of the operation that is received by the AV receiver 100. Specifically, the flow chart shown in FIG. 9 differs from the flow chart shown in FIG. 4A in the aspect that the AV receiver executes step S1B and step S2B, and in the aspect that the smartphone 500 executes step S11B and step S12B. Description of duplicated operations is omitted.

When the AV receiver 100 receives any operation (step S1B), it adds information about the received operation in the trigger information, and transmits the trigger information including the operation information to the smartphone 500 (step S2B). The operation information represents the content of the operation that is received by the AV receiver 100.

When the display program of the smartphone 500 receives the trigger information (step S11), it extracts the operation information from the received trigger information (step S11B). The display program selects the target program corresponding to the extracted operation information from the plurality of target programs, and activates the selected target program (step S12B). Specifically, the smartphone 500 stores beforehand association information between the operation information and target programs in the memory 54, and selects the target program corresponding to the operation information, by referring to the memory 54 using the operation information included in the trigger information.

Figure 10A:
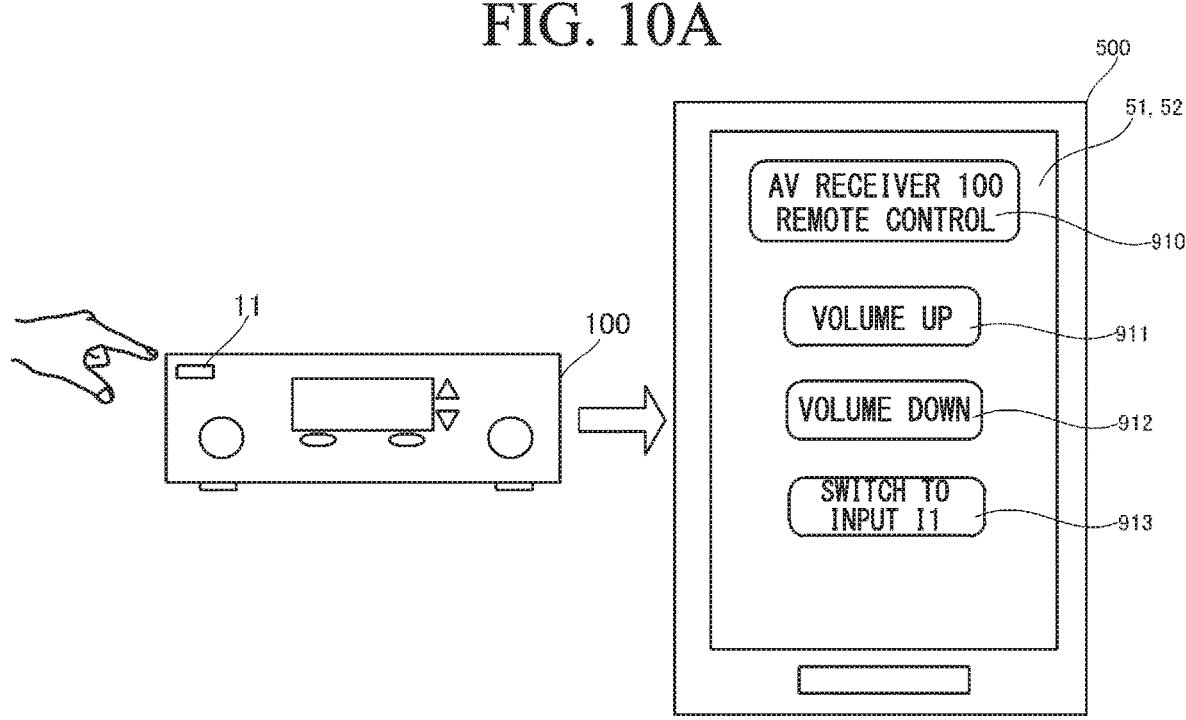
FIG. 10A is a diagram for describing the modified example 3 of automatic activation processing.
Figure 10B:
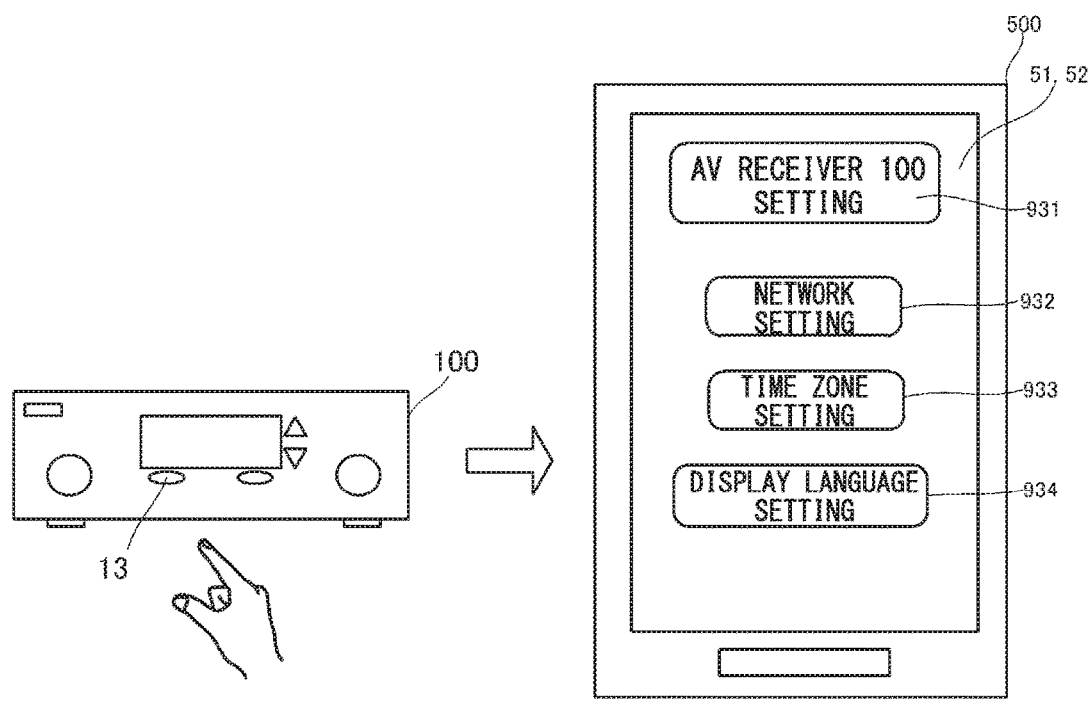
FIG. 10B is a diagram for describing the modified example 3 of automatic activation processing.

An operation example of step S1B, step S2B, step S11B, and step S12B is described with reference to FIGS. 10A and 10B. FIG. 10A and FIG. 10B each are conceptual diagrams for describing the modified example 3 of automatic activation processing.

As shown in FIG. 10A, when a user depresses the power button 11 of the AV receiver 100 (step S1B), the AV receiver 100 adds operation information indicating that it has received a power ON operation in the trigger information, and transmits the trigger information (step S2B). The display program of the smartphone 500 extracts the operation information indicating the power ON operation from the trigger information (step S11B), and activates a remote control program as the target program corresponding to the power ON operation (step S12B). Consequently, the smartphone 500 displays the screen of the remote control program.

As shown in FIG. 10B, when a user depresses the setting button 13 of the AV receiver 100 (step S1B), the AV receiver 100 adds in the trigger information operation information indicating that it has received an operation to start setting the AV receiver 100, and transmits the trigger information (step S2B). The display program of the smartphone 500 extracts the operation information indicating the operation to start the setting (step S11B), and activates a setting program as the target program corresponding to the operation to start the setting (step S12B). Consequently, the smartphone 500 displays the screen of the setting program.

A case where the AV receiver 100, in a state where the AV receiver 100 is in a power ON state, receives a power OFF operation as a result of the power button 11 being pressed is described. In this case, a trigger signal may be transmitted to the smartphone 500 in response to the AV receiver 100 receiving the operation. The smartphone 500 may, in response to receiving the trigger signal, stop (end) execution of the target program (the remote control program or the setting program) currently being displayed. In addition to the smartphone 500 stopping (ending) execution of the target program (the remote control program or the setting program) currently being displayed, it may switch the display of the smartphone 500 to the initial screen (refer to FIG. 3), or it may turn OFF the display of the smartphone 500 (stop the supply of power to the display 52 of the smartphone 500).

In the example shown in FIG. 9, FIG. 10A, and FIG. 10B, the display of the smartphone 500 is changed by changing the target program that is activated from among the plurality of target programs. The display may be changed by switching a hierarchical display of the target programs. For example, the display program transmits a hierarchical switching message corresponding to the operation information to a control program. Then, the target program switches the hierarchical display according to the hierarchical switching message.

The example mentioned above presented a remote control program and a setting program as target programs corresponding to the target apparatus. However, the present embodiment is in no way limited to such an example. The target program may be a playback program that, by transmitting the data of the content held by the smartphone 500 together with a playback instruction to the AV receiver 100, makes the AV receiver 100 play the content. That is to say, the target program may be a playback program that causes the data of the content to be transmitted to the AV receiver 100, and makes the AV receiver 100 play the content.

In the example mentioned above, the target program is a remote control program and a setting program that receive an operation from a user. However, the target program is in no way limited to a program that needs to receive an operation from a user. For example, the target program may be a program that, when the AV receiver 100 receives a power ON operation, then while receiving from the AV receiver 100 video data from the content playing device 200, displays the received video data.

In the example mentioned above, the target program and the other programs are stored in the memory 54 of the smartphone 500. However, it is not necessary for the smartphone 500 to store the programs. It is sufficient for the target program and the other programs to be executable by the smartphone 500. For example, acceptable is a mode where the target program and the other programs are stored on a server on the Internet, and the smartphone 500 reads out the programs from the server and executes them.

A program for realizing the function of the devices (for example, the AV receiver 100 and the playing device 200) according to the embodiment presented above may be recorded on a computer-readable recording medium, and processing may be performed by making a computer system read the program recorded on the recording medium, and then execute it.

The "computer system" referred to here may include an operating system (OS) and hardware such as a peripheral device.

The "computer-readable recording medium" includes a writable non-volatile memory such as a flexible disk, a magnetic optical disk, a ROM (Read Only Memory), and a flash memory, a portable medium such as a DVD (Digital Versatile Disk), and a recording device such as a hard disk that is built into the computer system.

The "computer-readable recording medium" also includes those that retain the program for a fixed time, such as a volatile memory (for example, DRAM (Dynamic Random Access Memory)) within the computer systems that become the server and the client in a case where the program is transmitted via a network such as the Internet, or a communication line such as a telephone line.

The program described above may be transmitted from a computer system storing the program in a storage device or the like, to another computer system via a transmission medium or by a transmission wave within the transmission medium. The "transmission medium" that transmits the program refers to a medium having a function of transmitting information, including a network (communication network) such as the Internet, or a communication line (communication wire) such as a telephone line.

The program described above may be one for realizing a part of the functions mentioned above.

The program described above may be one that realizes the functions mentioned above by being combined with a program already stored on the computer system, as a so-called difference file (difference program).

The present invention may be applied to a system, a target apparatus, a terminal, a program, and a method.

What is claimed is:

1. A system comprising:
an audio/video (AV) playing device; and
a wireless terminal configured to execute a plurality of programs, including a remote control program for operating the AV playing device,
wherein the AV playing device is configured to communicate with the wireless terminal, and comprises:
a power button that powers ON or OFF the AV playing device;
a first memory storing first instructions; and
a first processor that implements the first instructions to execute a first plurality of tasks, including:
a first transmission task that automatically and wirelessly transmits first trigger information, which instructs the wireless terminal to select and activate the remote control program, to the wireless terminal upon powering ON the AV playing device with the power button; and a second transmission task that automatically and wirelessly transmits second trigger information, which instructs the wireless terminal to end the selected remote control program, to the wireless terminal upon powering OFF the AV playing device with the power button, and wherein the wireless terminal comprises:

a display;

a second memory storing second instructions; and a second processor that implements the second instructions to execute a second plurality of tasks, including:

a first receiving task that automatically and wirelessly receives the first trigger information from the AV playing device upon powering ON the AV playing device;

a selection task that automatically selects and executes the selected remote control program from among the plurality of programs upon the first receiving task receiving the first trigger information;

a processing task that performs processing corresponding to the selected remote control program and controls the display to display software operators for remotely controlling functions of the AV playing device;

a second receiving task that automatically and wirelessly receives the second trigger information from the AV playing device upon powering OFF the AV playing device with the power button; and an end task that automatically ends the selected remote control program and controls the display of the wireless terminal to display an initial screen upon the second receiving task receiving the second trigger information.

2. The system according to claim 1, wherein the first trigger information includes identifying information that indicates the AV playing device.

3. The system according to claim 1, wherein the processing task activates the selected remote control program to cause the display to display information corresponding to the selected remote control program.

4. The system according to claim 1, further comprising:

a plurality of content playing devices, including the AV playing device, and the selection task specifies a source content playing device representing a transmission source of the first trigger information, from among the plurality of content playing devices, and selects and executes the selected remote control program corresponding to the source content playing device.

5. The system according to claim 1, wherein:

the selected remote control program causes the wireless terminal to:

permit receiving of a user operation from one of the software operators; and transmit, to the AV playing device, a remote control signal corresponding to a function of the one of the software operators.

6. The system according to claim 1, wherein:

the power button is configured to be depressed by a user, and the first transmission task automatically and wirelessly transmits the first trigger information to the wireless terminal upon the power button being depressed by the user.

7. The system according to claim 1, wherein:

the AV playing device further includes a data interface, and the first transmission task also transmits the first trigger information upon connecting a cable connected to the wireless terminal to the data interface.

8. The system according to claim 1, wherein the AV playing device includes an AV receiver, a television, or a content player.

9. The system according to claim 1, wherein the software operators include software buttons for settings of the AV playing device, including a network setting and a time zone setting.

10. A method of controlling a wireless terminal storing a plurality of programs including a remote control program for operating an audio/video (AV) playing device that includes a power button that powers ON or OFF the AV playing device, and including a display, the method comprising:

automatically and wirelessly transmitting, from the AV playing device, first trigger information, which instructs the wireless terminal to select and activate the remote control program, to the wireless terminal upon powering ON the AV playing device with the power button;

automatically receiving the first trigger information wirelessly from the AV playing device upon powering ON the AV playing device with the power button;

automatically selecting and executing, with the wireless terminal, the selected remote control program from among the plurality of programs upon receiving the first trigger information;

performing processing corresponding to the selected remote control program and controlling the display of the wireless terminal to display software operators for remotely controlling functions of the AV playing device;

automatically and wirelessly transmitting, from the AV playing device, second trigger information, which instructs the wireless terminal to end the selected remote control program, to the wireless terminal upon powering OFF the AV playing device with the power button;

automatically receiving the second trigger information wirelessly from the AV playing device upon powering OFF the AV playing device with the power button; and automatically ending the selected remote control program in the wireless terminal and controlling the display of the wireless terminal to display an initial screen upon receiving the second trigger information.

11. The method according to claim 10, wherein the AV playing device includes an AV receiver, a television, or a content player.

12. The method according to claim 10, wherein the software operators include software buttons for settings of the AV playing device, including a network setting and a time zone setting.

* * * * *